March 9, 1937.  C. J. KINZIE ET AL  2,072,889
ZIRCONIUM OXIDES AND METHOD OF MAKING SAME
Filed March 1, 1934  2 Sheets-Sheet 1
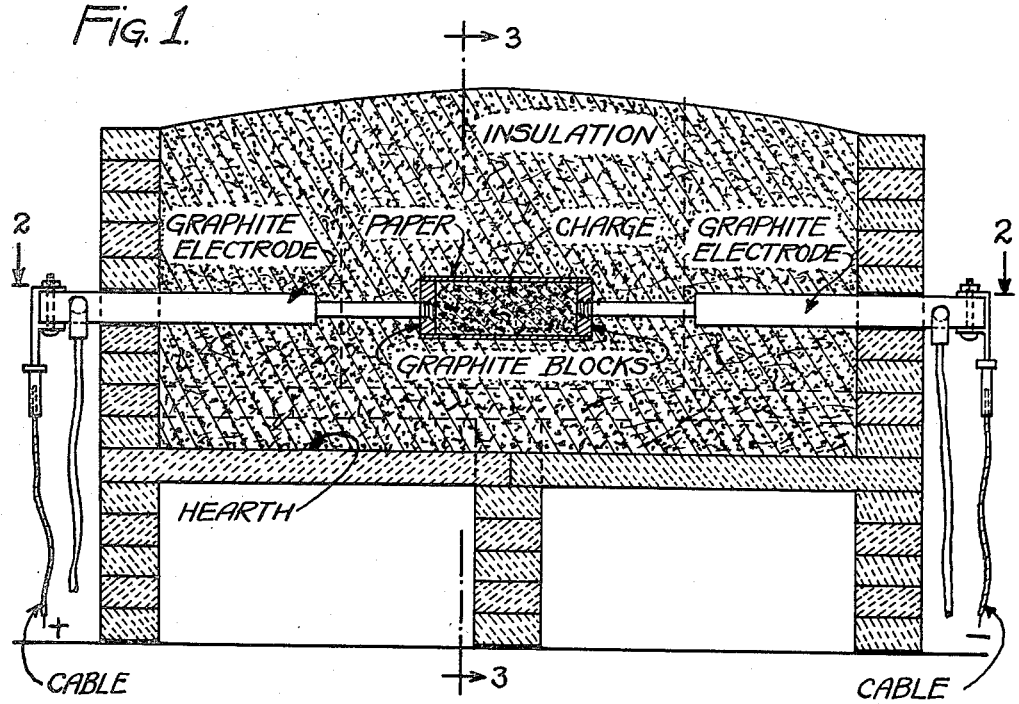
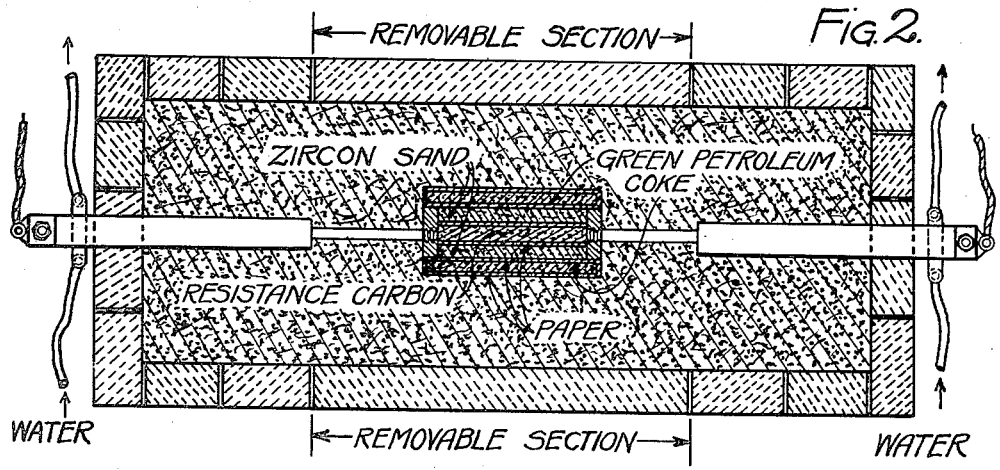
INVENTORS:
CHARLES J. KINZIE
DONALD S. HAKE
BY
ATTORNEY

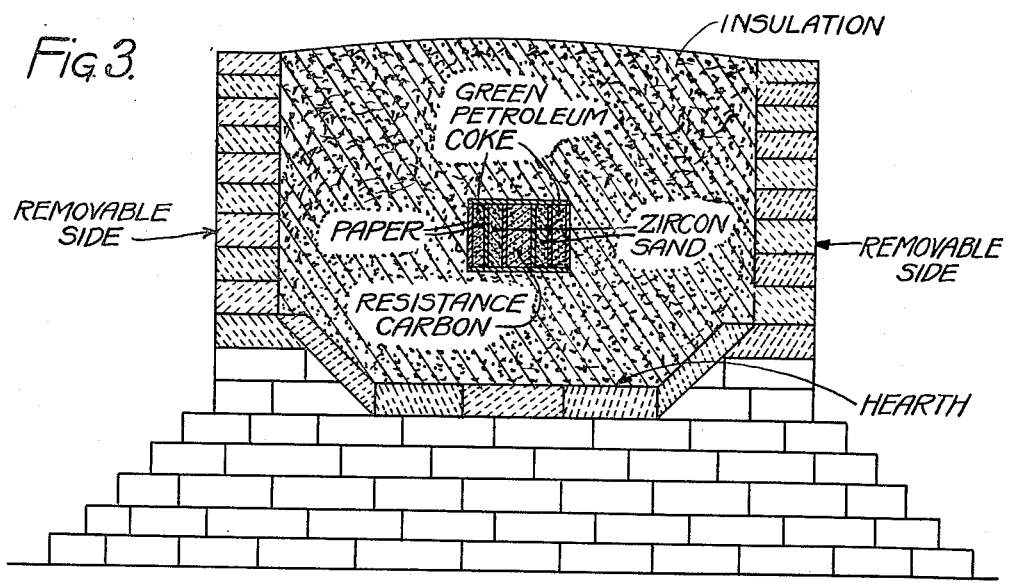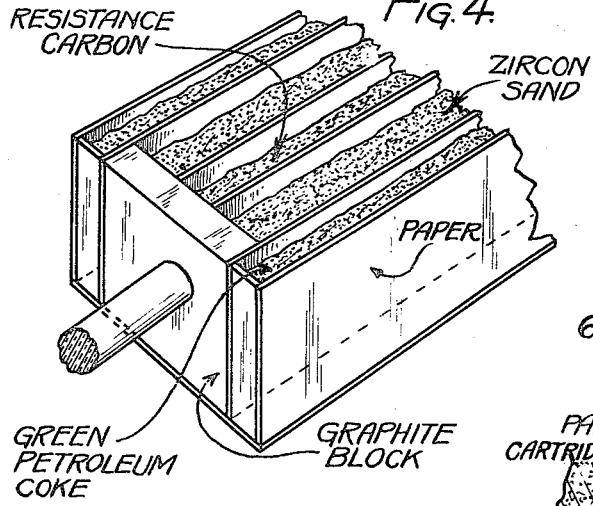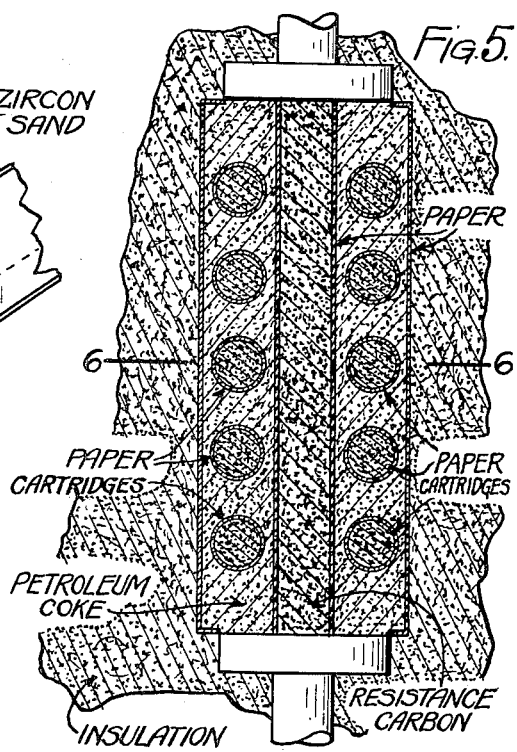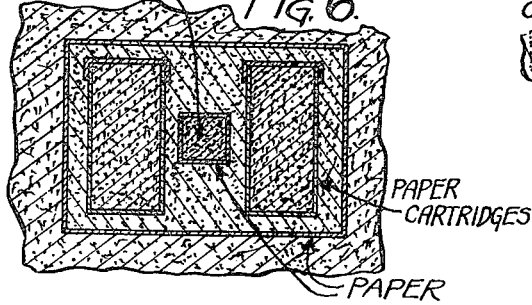

Patented Mar. 9, 1937

2,072,889

UNITED STATES PATENT OFFICE 2,072,889

ZIRCONIUM OXIDES AND METHOD OF MAKING SAME

Charles J. Kinzie and Donald S. Hake, Niagara Falls, N. Y., assignors to The Titanium Alloy Manufacturing Company, New York, N. Y., a corporation of Maine Application March 1, 1934, Serial No. 713,537

10 Claims. (Cl. 23—16)

Our invention relates to the production of an improved zirconium oxide, more particularly a new crystalline zirconium oxide of a high degree of purity in the form of synthetic baddeleyite, in the electric resistance furnace with the incidental production of silicon carbide as a by-product of the waste heat of the reaction.

Our invention consists primarily in the discovery that from zircon ($ZrSiO_4$), an essentially silicon-free crystalline zirconium oxide of exceptional purity may be made, while at the same time volatilizing essentially all the iron contained in the zircon. While accomplishing this result, there is also formed in the same furnace a substantial yield of silicon carbide, a portion of which may be the product of the silicon volatilized from the zircon, while the remaining portion of such silicon carbide is produced in the insulating mix consisting preferably of petroleum coke, silica sand and sawdust by the absorption of waste heat from the zirconium reaction zone or inner zone of the furnace.

Heretofore in the production of zirconium oxide, science has had to depend upon various relatively complicated chemical separations involving preliminary fusions of zircon with alkali and subsequent treatments with acid and various other later steps, such as crystallization, in order to separate the zirconium oxide from combined and other impurities such as silica which is combined with zirconia in the zircon ($ZrSiO_4$).

Other impurities such as iron, titanium, rare earth compounds, etc., have also been separated from the zirconium-containing material only by relatively complicated procedures.

According to our improved methods the zirconium-containing material is at no stage brought into solution, nor is the raw zirconium material decomposed or altered by the aid of fusion or other decomposing agents.

As a result of our discoveries upon which our improved methods are based, there is obtained a novel zirconium oxide product in the nature of a synthetic baddeleyite in the sense that its crystal form, refractive index, etc. are same as baddeleyite, but differing from baddeleyite in that our product has a degree of purity unknown in nature; based upon this high degree of purity, advantageous results in the art and industry are obtainable with the use of our improved product that could not be obtained with baddeleyite.

This new artificially prepared baddeleyite (zirconium oxide) is in the form of a dense crystalline material, and as so produced constitutes an excellent base for making superrefractory material and articles of zirconia.

By subjecting our product to finishing processes such as described in U. S. Patent 1,588,476 dated June 15, 1926, to Kinzie, an excellent white opacifying pigment for vitreous enamels, glazes and other applications may readily be produced.

The product of our invention, if milled to suitable fineness without any other treatment, is an excellent opacifier pigment that is cream-colored, but is free from the defects of zirconium oxide produced by other electro-thermal processes, such as the presence of dark-colored blemish producing particles not removed by simple oxidation.

Our invention is based on the discovery that by heating zirconium silicate in the absence of carbon in an electric resistance furnace, the silicon compounds are completely volatilized, and in addition iron compounds are also volatilized so as to leave practically only a trace of same in the resultant zirconium oxide product.

Starting with a relatively pure zirconium silicate there is left a mass consisting of practically pure zirconium oxide. Upon ignition the mass does not change in volume and the small amount of carbon compound present is eliminated so as to leave the zirconium oxide as a cream-colored material.

In practicing our invention as shown in the accompanying drawings to illustrate our methods, we build up a hearth of suitable material, preferably of common firebrick, to serve as a supporting base for the furnace and its charge, the base having side and end walls to retain the charge. Through each of the end walls there is a suitable opening for the placing of the graphite electrode, while all or part of the side wall of the furnace is built up of loose bricks to allow the free escape of evolved gases, and to also allow dumping of the insulating material used around the charge. The bottom of furnace is preferably supported on piers to allow ample space for air to circulate, and the bottom should not be too tight, only tight enough to retain the insulation charge. There should be cracks or small openings in the bottom to allow of ready escape of evolved gases.

Of the drawings showing different types of electric furnaces, Fig. 1 is a sectional elevation showing one type of furnace;

Fig. 2 is a section taken on the line 2—2 of Fig. 1;

Fig. 3 is a section taken on the line 3—3 of Fig. 1;

Fig. 4 is an enlarged perspective view of the granular graphite resistor partly broken way;

Fig. 5 is a fragmentary horizontal sectional view of a modified form of furnace; and Fig. 6 is a detail enlarged sectional view on the line 6—6 of Fig. 5.

The following example will serve to show how our methods can be practiced to produce this novel zirconium oxide product, and will also include a description of the characteristics and properties which differentiate this product from natural baddeleyite as well as from prior synthetic zirconium oxides.

*Example A.*—The following complete example will serve to show how our methods may be used to produce our new zirconium oxide product and a by-product of silicon carbide (SiC). The furnace as shown in the accompanying drawings was loaded in the following manner:

An insulating mix is first prepared by mixing the following materials:

| | Parts by weight |
|---|---|
| Green petroleum coke | 37 |
| Silicon sand | 55 |
| Wood sawdust | 8 |
| | 100 |

Other forms of carbon may be used in place of petroleum coke such as coal or calcined coal in the form of foundry coke if desired.

This mixture is charged upon the hearth of the furnace to a depth of about ten inches and leveled off and then in center over an area of about fifteen inches by six inches a piece of thin tough paper was placed.

The graphite electrodes consist preferably of round one inch by twenty-six inch long pieces, one through each end wall, the exterior ends being suitably connected to the source of current, while the ends within the furnace are brought to within twelve inches of each other, leaving this twelve inch space for the placing of the granular graphite resistor. At each end of the round one inch graphite electrodes is a three inch by three inch by one inch block of graphite to confine the zones of various materials.

Outside the furnace the ends of the graphite electrodes may be cooled by passing a current of water through them as shown in Figs. 1 and 2.

Sheets of thin tough paper were then arranged in place so as to form a zone one inch wide by three inches high between the electrodes and into this space granular graphite one-eighth inch mesh was placed.

Then sheets of thin tough paper were arranged, one on each side, one inch away from the sheets confining the granular graphite core, and these two spaces were filled with zircon sand of the following composition:—

| | Per cent |
|---|---|
| Zirconium silicate (ZrSiO$_4$) | 97.00 |
| Iron impurity (calculated as Fe$_2$O$_3$) | 0.15 |
| Titanium impurity (calculated as TiO$_2$) | 0.20 |
| Balance free SiO$_2$ and other materials | 2.65 |
| | 100.00 |

There was then arranged one inch away from the paper confining the zircon, other sheets of paper and in the space so formed is placed green petroleum coke. A piece of tough paper was then placed to cover the confined charge as shown in Fig. 4, and the entire remaining space in the furnace was then filled with the mixture of coke, sand and sawdust as used at the bottom (Figs. 1 and 3).

As shown in Figs. 1 and 2, the graphite electrodes extend in through the furnace wall and are connected outside with a suitable source of electric power, and are connected inside with a one inch wide by three inches high by twelve inches zone of granular graphite. At each side of this granular graphite core is a zone of zircon sand twelve inches long, one inch wide and three inches high. Outside the zircon zones are zones of petroleum coke twelve inches long, one inch wide and three inches high. The granular graphite core, the zircon and the coke are as a whole temporarily separated from the insulating mix at the bottom, sides and top by layers of paper, and at the ends by the contact blocks of graphite and also by paper (Figs. 2–4).

The charge is therefore completely surrounded at the bottom, sides, top and ends with approximately twelve inch zone of this insulating charge. The source of power which we used in this Example A was a laboratory transformer 12 k. v. a. with a secondary voltage range of 2 to 45 volts in steps of 2 volts. A voltmeter and an ammeter were connected and used to measure terminal voltage and secondary current. The current was turned on and the run was of 6½ hours duration, using from 30 to 42½ secondary voltage and an average of about 280 amperes, which developed a temperature sufficiently high to dissociate the ZrSiO$_4$ and volatilize the silicon as well as to form SiC in the adjacent zones of the furnace. The temperature probably is between about 2200 and 2700° C., probably about 2500° C. in the core.

As the run progressed, the carbon monoxide gas evolved was ignited at various points at the sides, ends and bottom of the furnace. The exterior of the furnace bottom hearth, side walls, or top of the insulating mix were never much above room temperature, and the warmth at these points was mainly the result of the burning of carbon monoxide or other gases purposely ignited from the outside so as to convert same into harmless gases.

After 6½ hours, the current was turned off and furnace and its charge was allowed to cool for about 72 hours.

The top and side insulations were removed thereby exposing an envelope or shell of greenish colored crystals, which upon analysis proved to consist mainly of crystals of silicon carbide (SiC), a well-known abrasive and refractory material. Upon removal of this outer shell of silicon carbide, we found two zones of silicon carbide occupying the zones which formerly consisted of the layers of petroleum coke, this silicon carbide having been formed apparently by the silicon material as it was volatilized from the zircon, which silicon material combined with the coke to form silicon carbide.

In the zone originally filled with the zircon sand we found a friable gray-colored mass consisting of zirconium oxide containing a small amount of combined carbon, the carbon content by analysis being 0.10%.

This gray-colored mass upon calcination changed quickly to a cream-colored material without increasing or decreasing noticeably as regards volume, and without materially effecting the structure of the constituent zirconium oxide.

The zirconium oxide so produced contained by analysis:—

| | Per cent |
|---|---|
| Silicon (calculated as $SiO_2$) | Nil |
| Titanium (calculated as $TiO_2$) | 0.14 |
| Iron (calculated as $Fe_2O_3$) less than | 0.005 |
| Balance zirconium oxide + | 99.855 |
| | 100.000 |

Upon simple crushing or rubbing down this cream-colored friable mass to about 35 mesh aggregates, and then subjecting same to examination under a petrographic microscope the following observations were made:—

A cream-colored granular powder which consists almost exclusively of aggregates of crystals showing lamellar twinning. The lamellae are very rarely more than .02 mm. long, and the bulk of them are .005 to .015 mm. in length. The refractive index is $\gamma - 2.20$ and $\alpha - 2.12$, which are characteristic of baddeleyite.

A few percent of other grains are present. These consist of crystals too minute to determine in a matrix that is either glassy or too minutely crystalline to resolve microscopically. The aggregate refractive index is somewhat variable and definitely, but not greatly, lower than for the coarse crystals, namely about 2.0.

X-ray studies have been made comparing the $ZrO_2$ product of this case with the $ZrO_2$ of our companion case filed March 1st, 1934, Serial No. 713,536 and with a reagent form of $ZrO_2$ which is commonly used.

The diffraction pattern of $ZrO_2$ of our companion case Serial No. 713,536 gave broad $ZrO_2$ lines showing presence of $ZrO_2$ particles too small to be clearly seen with the microscope. The diffraction pattern of $ZrO_2$ of this case showed that the particles were almost exclusively those of $ZrO_2$ of such size as to be easily determinable with the microscope. The diffraction lines of the reagent $ZrO_2$ agreed with lines of the $ZrO_2$ product as our companion case, except that in the pattern for the reagent $ZrO_2$, a few faint lines showed not seen in others and were presumably due to impurities not present in the respective $ZrO_2$ products of this and our companion case Serial No. 713,536.

Hence by combining the evidence of chemical analysis, the microscope, and the X-ray films, we conclude and assert that the $ZrO_2$ of this case consists almost wholly of crystals of baddeleyite of such sizes as to be determinable with the microscope, and that the $ZrO_2$ claimed in our companion application Serial No. 713,536 consists of a mixture of minute crystals of $ZrO_2$ in glass. Since the analysis shows mainly $ZrO_2$, then the glass in which minute $ZrO_2$ crystals have formed is a pure $ZrO_2$ glass or vitreous $ZrO_2$ as set forth in our companion case Serial No. 713,536.

By way of comparison the following chemical analysis of what must have been a carefully selected specimen of baddeleyite, the purest found in nature in pebble form, was as follows (Mellor's Treatise Inorganic Chemistry, Vol. VII pages 122, 123, Titanium, Zirconium, etc.):

| | Per cent |
|---|---|
| $ZrO_2$ | 96.52 |
| $SiO_2$ | 0.70 |
| $Al_2O_3$ | 0.43 |
| $Fe_2O_3$ | 0.41 |
| CaO | 0.55 |
| MgO | 0.10 |
| $Na_2KO$ | 0.42 |
| Loss on ignition | 0.39 |

Mellor also states that the pebbles of baddeleyite from Brazil classified and showed the analyses as follows:

| | Red and friable | Pale red and hard | Reddish black, hard | Gray and very dense | Vitreous and glassy |
|---|---|---|---|---|---|
| $ZrO_2$ | 80.54 | 87.99 | 88.97 | 93.12 | 95.46 |
| $SiO_2$ | 6.21 | 5.89 | 5.87 | 3.06 | 1.35 |
| $TiO_2$ | 0.12 | 0.74 | 0.96 | 0.69 | 0.76 |
| $Al_2O_3$ | 9.03 | 3.78 | 3.54 | 3.03 | 2.84 |
| Ignition loss | 2.01 | 0.54 | 0.51 | 0.07 | |

Therefore it is obvious that the processes in nature have never produced a zirconium oxide even remotely approaching our improved zirconium oxide in purity.

All natural forms of $ZrO_2$ as shown in Mellor start to melt at about 2000° C., and are limited in their refractory properties due to the associated impurities, while our new pure synthetic mineral has the very high melting point of the pure oxide viz: 2700–2900° C. The purest natural form of baddeleyite, even when finely milled, is at best a brown-colored material which cannot be used to bring about the pure white effects which our novel synthetic $ZrO_2$ produces when embodied in enamels, glazes and general pigmenting applications.

This Example A shows that by means of our new methods a pure synthetic baddeleyite ($ZrO_2$) may be produced directly from $ZrSiO_4$, and that the silicon evolved has been converted to the useful silicon carbide, while the heat after accomplishing its major function has been effectively used to form additional silicon carbide from the inner zones of insulating mix.

We do not wish to confine our methods of charging to that specifically described in foregoing Example A. For instance, the zircon may be placed below and above the core of granular graphite as well as at the sides.

The zircon may also be arranged in suitable containers such as paper or cardboard cartridges which are placed adjacent the core and are surrounded with coke. Graphite or carbon containers may likewise be used to hold the zircon charge, and may be simply removed and discharged after the reaction is over and the charge cooled.

We do not wish to confine ourselves to the use of granular carbon as the core material; any suitable conductor, such as graphite or carbon rods or mixture of same, may be used as the resistor with satisfactory results.

In case it is desired to burn out the small amount of carbonaceous material the furnace may be opened while charge is still hot and the small amount of carbon compounds allowed to oxidize in air of its own heat.

To the best of our knowledge we have discovered and produced an improved zirconium oxide suitable as a refractory material for high temperatures; also for use as an opacifier in enamels, etc. as well as a practical chemically pure reagent $ZrO_2$ which has been produced directly from zircon without chemical or fusion treatments.

We have thereby not only effected a marked advance in the zirconium art by way of producing a novel pure zirconium oxide at a cost much lower than for all other zirconium oxide processes, but also have additionally produced silicon carbide in the same furnace which additionally reduces the cost, since this SiC is also a useful product.

In addition to being suitable as a superrefractory, an opacifier and as a pure zirconium constituent for glass and enamel compounding, our new synthetic zirconium oxide product is a useful material in the production of pure zirconium compounds, sulphates, fluorides, etc., since unlike the zircon ($ZrSiO_4$) from which it was made, our new and improved zirconium oxide is soluble in either of these acids.

In the foregoing specification we have set forth in detail our improved methods and resulting new product, and now wish to describe how we have also practiced our invention with crude zircon containing considerable titanium and iron impurities and in the following Examples B and C we have illustrated the methods and resulting product with the use of crude zircon sand.

*Example B.*—Crude zircon sand was used having the following analysis:

| | Per cent |
|---|---|
| Zirconium (calculated as $ZrO_2$) | 60.00 |
| Silicon (calculated as $SiO_2$) | 30.11 |
| Titanium (calculated as $TiO_2$) | 3.00 |
| Iron (calculated as $Fe_2O_3$) | 0.32 |
| Others—$Al_2O_3$—$P_2O_5$ rare earths, etc. | 6.57 |
| | 100.00 |

As shown in Figs. 5 and 6 this sand was loaded into paper wrappings or cartridges 1½ inches diameter by 3 inches high, and ten of these loaded cartridges were placed five on each side of granular graphite resistor core with the cartridges enveloped with petroleum coke. The charge was then surrounded by the insulating mix as in Example A. The power was turned on and the run was of about eight hours duration, using from 34 to 45 volts and a maximum of 280 amperes.

The furnace was then cooled and the cakes of zirconium material were found to be encased in envelopes of silicon carbide which was removed.

The residue of sintered zirconium material after removal of the silicon carbide contained 0.10% carbon, and when gently heated this small amount of carbon was eliminated so as to yield a product ranging from buff to salmon in color, and which showed upon analysis the following:

| | Per cent |
|---|---|
| Silica | Nil |
| Iron (calculated to $Fe_2O_3$) | 0.01 |
| Titanium (calculated to $TiO_2$) | 3.50 |
| Balance mainly crystalline zirconium with small amounts of impurities | 96.49 |

It will be observed that in this Example B as was case in Example A, the silicon was completely eliminated and we also found that the iron had been reduced to a negligible amount. The titanium was also materially reduced in amount, since if all the $TiO_2$ in the original zircon used had remained in the residual $ZrO_2$ product, the percentage of titanium would have been about 5%. Therefore about 40 percent of the total titanium originally present in the crude zircon was removed according to the procedure just described.

The product of this Example B can be used for those applications in which the purest product is not required. For instance, it can be processed to an opacifier for light cream-toned enamels, glazes and paints, and can also be used in refractories where the temperature requirements are not too severe.

*Example C.*—In this example crude zircon sand of the following composition was loaded in the same manner as in Example B, and run in same manner for about eight hours.

*Composition of crude zircon introduced in charge*

| | Per cent |
|---|---|
| Zirconium (calculated as $ZrO_2$) | 50.00 |
| Silicon (calculated as $SiO_2$) | 30.00 |
| Titanium (calculated as $TiO_2$) | 8.00 |
| Iron (calculated as $Fe_2O_3$) | 0.60 |
| Others ($Al_2O_3$—$P_2O_5$ rare earths) | 11.40 |
| | 100.00 |

The hard gray-black zirconium material contained 0.40% carbon which was readily eliminated by gentle calcination leaving a buff colored zirconium oxide material of the following analysis.

| | Per cent |
|---|---|
| Silica | Nil |
| Iron (calculated as $Fe_2O_3$) | 0.08 |
| Titanium (calculated as $TiO_2$) | 8.50 |
| Balance mainly zirconium oxide with some impurities | 91.42 |
| | 100.00 |
| Percent titanium elimination about | 40 |

Zirconium ores containing both zircon ($ZrSiO_4$) and $ZrO_2$—for instance Brazillite may be similarly purified of their iron and silicon content while reducing the titanium in about same proportion as in Examples B and C.

Our methods are a marked advance over the electric arc furnace method for treating zirconium-containing minerals. In the latter there is a fume and dust problem as well as enormous loss of energy in the form of heat, while in our methods the high temperatures are obtained and useful products produced with little loss of energy and without dust evolution of any kind, since the carbon monoxide is properly burned or ventilated, the operation involving no external heat problem and no dust problem.

In industrial practice the insulating mixture would be used over and over again, enriching it in any of its ingredients as may become deficient and keeping the mix sufficiently porous by occasionally renewing the sawdust.

We claim as our invention:

1. The method of making a crystalline zirconium oxide from zirconium silicate which comprises heating said silicate enveloped in an insulating mix in an electric resistance furnace with substantially complete expulsion of silicon compounds, and calcining the mass so as to produce said zirconium oxide more than 99.50% $ZrO_2$ in the form of synthetic baddeleyite with traces of titanium and iron but no silicon.

2. The method of making a crystalline zirconium oxide from zirconium silicate which comprises heating said silicate without being in intimate contact with carbon and enveloped in an insulating mix in an electric resistance furnace with substantially complete expulsion of silicon compounds, and calcining the mass so as to produce said zirconium oxide more than 99.50% $ZrO_2$ in the form of synthetic baddeleyite with traces of titanium and iron but no silicon.

3. The method of making a crystalline zirconium oxide from zirconium silicate which comprises heating said silicate enveloped in, but without being in intimate contact with, an insulating mix containing coke, sand and sawdust in an electric resistance furnace with substantially complete expulsion of silicon compounds, and calcining the mass so as to produce said zirconium oxide more than 99.50% $ZrO_2$ in the form of synthetic baddeleyite with traces of titanium and iron but no silicon.

4. The method of making a crystalline zirconium oxide from zirconium silicate which comprises heating said silicate without being in intimate contact with carbon and enveloped in an insulating mix containing coke, sand and sawdust in an electric resistance furnace with substantially complete expulsion of silicon compounds, and calcining the mass so as to produce said zirconium oxide more than 99.50% $ZrO_2$ in the form of synthetic baddeleyite with traces of titanium and iron but no silicon.

5. The method of making a crystalline zirconium oxide from zirconium silicate which comprises heating said silicate enveloped in an insulating mix in an electric resistance furnace with substantially complete expulsion of silicon compounds therein, and then calcining the charge to remove carbon so as to produce the crystalline zirconium oxide more than 99.50% $ZrO_2$ in the form of synthetic baddeleyite with traces of titanium and iron but no silicon.

6. The method of making a crystalline zirconium oxide from zirconium silicate which comprises heating said silicate enveloped in but without being in intimate contact with, an insulating mix containing coke, sand and saw-dust in an electric resistance furnace with substantially complete expulsion of silicon compounds therein with formation of silicon carbide, removing the latter from the charge, and then calcining the charge to remove carbon so as to produce the crystalline zirconium oxide more than 99.50% $ZrO_2$ in the form of synthetic baddeleyite with traces of titanium and iron but no silicon.

7. The method of making a crystalline zirconium oxide compound from crude zircon which comprises heating said zircon enveloped in but without being in intimate contact with a carbonaceous reducing agent in an electric resistance furnace with substantially complete expulsion of silicon and iron compounds, then removing the silicon carbide formed and calcining the resulting material to form a crystalline zirconium oxide compound in the form of synthetic baddeleyite free from silicon and in which about 40% of the titanium in the zircon has been eliminated.

8. The method of making a crystalline zirconium oxide compound from crude zircon which comprises heating said zircon enveloped in, but without being in intimate contact with an insulating mix containing coke, sand and sawdust in an electric resistance furnace with substantially complete expulsion of silicon and iron compounds, then removing the silicon carbide formed and calcining the resulting material to form a crystalline zirconium oxide compound in the form of synthetic baddeleyite free from silicon and in which about 40% of the titanium in the zircon has been eliminated.

9. The method of making a crystalline zirconium oxide compound from crude zircon which comprises heating said zircon enveloped in, but without being in intimate contact with, a carbonaceous reducing agent in an electric resistance furnace with substantially complete expulsion of silicon and iron compounds, then removing the silicon carbide formed and calcining the resulting material to form a crystalline zirconium oxide compound in the form of synthetic baddeleyite free from silicon and having a titanium content not over 10%.

10. The method of making a crystalline zirconium oxide compound from crude zircon which comprises heating said zircon enveloped in, but without being in intimate contact with, a carbonaceous reducing agent in an electric resistance furnace with substantially complete expulsion of silicon and iron compounds, then removing the silicon carbide formed and calcining the resulting material to form a crystalline zirconium oxide compound in the form of synthetic baddeleyite free from silicon and having a titanium content not over 4%.

CHARLES J. KINZIE.
DONALD S. HAKE.